June 10, 1958 E. H. LAND 2,837,987
PHOTOGRAPHIC PRODUCT
Filed June 16, 1954 3 Sheets-Sheet 1

INVENTOR
Edwin H. Land
BY Brown and Mikulka
and
Gerald Altman
ATTORNEYS

June 10, 1958 E. H. LAND 2,837,987
PHOTOGRAPHIC PRODUCT

Filed June 16, 1954 3 Sheets-Sheet 2

INVENTOR
Edwin H. Land

BY Brown and Mikulka
and
Gerald Altman
ATTORNEYS

June 10, 1958 — E. H. LAND — 2,837,987
PHOTOGRAPHIC PRODUCT
Filed June 16, 1954 — 3 Sheets-Sheet 3

INVENTOR
Edwin H. Land

BY Brown and Mikulka
and
Gerald Altman
ATTORNEYS

United States Patent Office 2,837,987
Patented June 10, 1958

2,837,987

PHOTOGRAPHIC PRODUCT

Edwin H. Land, Cambridge, Mass., assignor to Polaroid Corporation, Cambridge, Mass., a corporation of Delaware Application June 16, 1954, Serial No. 437,058

33 Claims. (Cl. 95—66)

This invention relates to photography and, more particularly, to a photographic magazine within which a photosensitive element may be both exposed and processed, and to an assemblage of such a photographic magazine and such a photosensitive element together with materials useful in its processing.

A variety of lighttight photographic magazines have been proposed for enclosing a photosensitive element in transport between darkroom and camera. Such a magazine customarily is removably attached to the camera back and positions the photosensitive element in the focal plane of the camera lens. Such a magazine may be provided with a dark slide which, when closed, renders it lighttight and, when open, permits passage of light to the photosensitive element. Where, as in X-radiography, a face of the magazine, although opaque to light, is transparent to X-radiation, no dark slide is necessary.

The present invention contemplates a novel magazine which is designed to operate in the foregoing manner but which additionally is designed to enable the photosensitive element to undergo, within the confines of the magazine which is in an illuminated environment, a process of the well-known type in which the photosensitive element is superposed on another element and a processing composition is spread between the elements in a thin layer. The present invention contemplates a novel assemblage in which such photographic materials utilize the space within such a magazine to maximum advantage.

Objects of the invention are: to provide a photographic magazine comprising a generally flat housing, one face of which provides a path for actinic radiation to a photosensitive element within the housing, and a pair of pressure-applying members mounted within the housing at one of a pair of its opposed extremities for spreading processing composition between the photosensitive element and another element to form a sandwich, the other of the pair of opposed extremities providing a lighttight passage through which the sandwich may be withdrawn from the housing; to provide a photographic assemblage comprising a generally flat housing having front and rear opposed faces, one of which provides a path for actinic radiation and a pair of opposed extremities one of which provides a lighttight passage, and a first strip and a second strip within the housing, each strip having inner and outer overlapping sections joined by a loop at the other of the pair of opposed extremities, the outer section of the first strip carrying a photosensitive element and underlying the front face, the outer section of the second strip underlying the rear face, the inner sections of the strips extending in superposed relation from within the housing through the passage; to provide a photographic assemblage of the foregoing type in which additional sections of the first strip carrying additional photosensitive elements are disposed in zigzag fashion between its inner and outer sections and additional sections of the second strip are disposed in zigzag fashion between its inner and outer sections; to provide the housing of an assemblage of the foregoing type with an opening through which a pair of pressure-applying members may be inserted into the pair of loops provided by the first and second strips; and to provide an assemblage of the foregoing type which comprises pressure-applying members that extend through the loops provided by the first and second strips.

Further objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
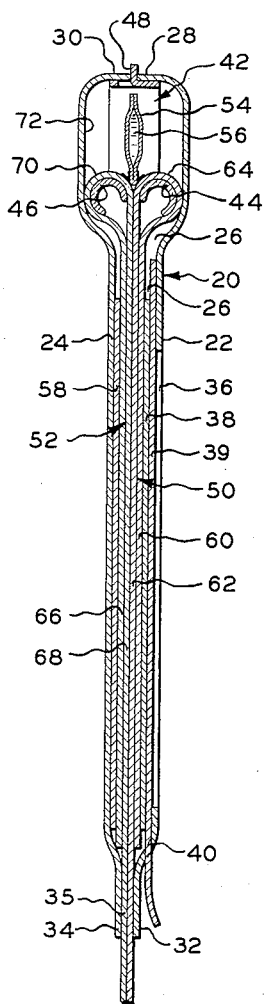
Figure 1 is an exaggerated sectional view of an assemblage embodying the invention, the section being taken midway between its longitudinal edges.

Generally, each of the assemblages, herein specifically described as illustrative of the present invention, comprises a magazine ordinarily lighttight and two flexible strips mounted within it, the first carrying a photosensitive element to be exposed and the second carrying materials for processing it. The magazine, generally flat, has front and rear opposed faces one of which is designed to transmit actinic radiation to the photosensitive element when desired. The magazine provides at one of a pair of its opposed extremities a lighttight passage through which the flexible strips may be advanced from within the magazine. Each of the strips has inner and outer overlapping sections generally parallel to the faces of the magazine and joined by a loop in the neighborhood of the other of the magazine's pair of opposed extremities referred to above. The outer section of the first strip, stored in the region of the chamber underlying the front face, carries the photosensitive element which is designed to be exposed to actinic radiation through a path provided by one of the faces. This path, for example, may be provided with a dark slide when the radiation is visible or may be an opaque portion of one of the faces when the radiation is pentrative, i. e., X- and gamma radiation. The outer section of the second strip, stored in the region of the chamber underlying the rear face, includes a portion designed to be superposed on the photosensitive element and carries a rupturable container confining a processing composition designed to be spread between this portion and the photosensitive element so superposed. This portion, if desired, may carry an element designed to perform a function other than merely spreading the processing composition upon the photosensitive element. The inner sections of the strips extend in superposed relation through the region more or less midway between the regions in which the outer sections of the first and second strips are stored and their leading ends protrude through the lighttight passage. The pair of loops formed by the first and second strips are provided to receive a pair of pressure-applying members between which the strips may be advanced, by an operator grasping their leading ends, in order to rupture the container and to spread its contents between the photosensitive element and the portion of the second strip with which it is associated. The resulting sandwich, while being formed, advances into the region previously occupied by the strips' inner sections, and, once formed, is permitted to remain in this region for a predetermined period during which the photosensitive element is processed. At the end of this period, the sandwich is advanced through the lighttight passage from the magazine by an operator once again grasping the strips' leading ends. Thereafter, the photosensitive element and the portion of the second strip with which it is associated may be stripped apart. Exposing and processing a plurality of photosensitive elements may be accomplished within such an assemblage where additional sections of the first strip alternately carrying the photosensitive elements, for example, are disposed in zigzag fashion between its inner and outer sections and additional sections of the second strip are disposed, for example, in zigzag fashion between its inner and outer sections. The above-described assemblage utilizes the space within the magazine virtually without waste so as to limit the magazine to an overall thickness only slightly greater than the sum of the thicknesses of the sections within it.

Effective spreading of processing composition between superposed elements in the foregoing manner is dependent upon the position and direction of the compressional forces exerted. Such compressional forces are best exerted between adjacent surface increments lying along parallel lines. The structure of pressure-applying members for exerting such compressional forces is dictated by the conflicting requirements of low cost and high precision. For example, where a disposable magazine is contemplated and optimum precision is unnecessary, low cost pressure-applying members, such as elongated sheet metal arcs or plastic rollers, may be employed. On the other hand, where a durable reloadable magazine is contemplated and optimum precision is desired, high cost pressure-applying members, such as machined metallic rollers, may be employed. Alternatively, high precision pressure-applying members as components of a permanent pressure-applying device may be employed in conjunction with a disposable assemblage, the magazine of which is provided with a suitable opening through which the pressure-applying members may be inserted.

The various embodiments of the present invention, as shown in the drawings, will now be described in detail, like numerals denoting like parts.

Figure 1 illustrates a disposable self-contained photographic exposing and developing assemblage comprising an ordinarily lighttight envelope, a strip carrying a single photosensitive element and a strip carrying photographic materials for processing it.

The envelope, generally designated at 20, comprises a front face portion 22 and a rear face portion 24 which define a chamber 26. The envelope further comprises edge portions, of which sealed pairs of longitudinal edge portions (not shown) and an integral pair of transverse edge portions 28 and 30 connect the front and rear face portions, and a pair of transverse edge portions 32 and 34 define a lighttight passage 35 communicating with the chamber.

Front face portion 22 is provided with an optical path 36 through which actinic light may be transmitted to a photosensitive element 38 within chamber 26. Associated with path 36 is a dark slide 39 which, in open position when removed from chamber 26 through a passage 40, permits transmission of actinic radiation through path 36 and which, in closed position when covering path 36, renders chamber 26 lighttight.

Supported within chamber 26 on transverse edge portions 28 and 30 is a pressure-applying unit 42 in the form of a resilient sheet metal stamping from which are shaped a pair of elongated pressure-applying arcs 44 and 46 that are predeterminedly spaced apart and a lug 48 that extends through envelope 20 in order to enable an operator to hold the arcs as well as the assemblage as a whole firmly in one position. Pressure-applying unit 42, because of its inexpensive construction, is disposable with the remainder of the envelope after the assemblage has been used.

A pair of flexible strips 50 and 52 within chamber 26 serve to carry photosensitive element 38, a container 54 of a processing composition 56 and another element 58 between which and the photosensitive element the processing composition is to be spread. Container 54, the leading edge of which is connected to strip 52 at the point where it meets strip 50, is positioned between arcs 44 and 46 and lug 48 so as to be readily and immediately advanced between the arcs with the strips. Strip 50 has outer and inner overlapping sections 60 and 62 joined by a loop 64 about arc 44. Strip 52 has outer and inner overlapping sections 66 and 68 joined by a loop 70 about arc 46. Inner sections 62 and 68 extend in superposed relation between outer sections 60 and 66 with their leadings ends protruding through passage 35.

In the operation of the assemblage of Fig. 1, once photosensitive element 38 has been exposed through path 36, strips 50 and 52 are advanced, by an operator grasping their leading ends, between pressure-applying arcs 44 and 46 in order to rupture container 54 and to spread processing composition 56 between elements 38 and 58. The resulting sandwich, while being formed, advances into the region previously occupied by inner sections 62 and 68 and, once formed, is permitted to remain in this region for a predetermined period during which the photosensitive element is processed. At the end of this period, the sandwich is advanced through passage 35 from the magazine by an operator once again grasping the strips' leading ends. Thereafter, elements 38 and 58 are stripped apart for observation.

In a preferred form of the assemblage of Fig. 1, envelope 20 is composed of a stiff cardboard or plastic material, strips 50 and 52 are composed of a flexible paper that is opaque for the purpose of keeping passage 35 lighttight while the assemblage is in operation, and element 38 contains as its photosensitive material at least one heavy metal salt, for example a silver halide such as silver chloride, silver bromide and silver iodide, dispersed in a suitable vehicle, for example a protective colloid such as gelatin, albumen, casein, collodion or cellulose ester.

Here, processing composition 56, when spread in a uniformly thin layer between elements 38 and 58, effectuates a silver halide, diffusion transfer-reversal process by which a latent image in element 38 is developed and a positive print is produced in element 58. Processing composition 56, for example, contains an aqueous solution of a silver halide developer such as hydroquinone, a silver halide solvent such as sodium thiosulfate and an alkali such as sodium hydroxide. In this process, elements 38 and 58 are maintained in superposed relation with the layer of processing composition 56 interposed between them for a predetermined period, ordinarily of approximately 40 to 120 seconds in duration, during which the exposed silver halide of element 38 is reduced to silver and unreduced silver halide of element 38 forms a water-soluble, complex silver salt which diffuses through the layer of composition to element 58 where, upon being reduced to silver, it forms a visible print. Examples of photographic materials useful in processes of the foregoing type are described in detail in Patent No. 2,543,181, issued in the name of Edwin H. Land on February 27, 1951, for Photographic Product Comprising a Rupturable Container Carrying a Photographic Processing Liquid, and in Patent No. 2,647,056, issued in the name of Edwin H. Land on July 28, 1953, for One-Step Photographic Transfer Process.

It is possible to provide element 58 with a stratum which, in one form, includes silver precipitating nuclei dispersed in a macroscopically continuous vehicle comprising submacroscopic agglomerates of minute particles of a water-insoluble, inorganic, preferably siliceous, material such as silica aerogel. The use of such materials tends to aggregate the silver that is precipitated into its most effective condition for print formation. Materials of this type are specifically described in copending U. S. application Serial No. 727,385, filed by Edwin H. Land on February 8, 1947, for Photographic Product and Process, now Patent No. 2,698,245, and Serial No. 164,908, filed by Edwin H. Land on May 29, 1950, for Photographic Silver Halide Product and Process, now abandoned.

It is to be expressly understood that processing composition 56 need not effectuate a diffusion transfer-reversal process but may act merely to develop the latent image in element 38. In this case, the composition contains an alkaline aqueous solution of a silver halide developer and element 58 acts merely to spread it upon element 38. Here, element 58 may be omitted if a portion of strip 52 itself is sufficiently nonabsorbent to effectively spread the composition upon element 38.

In the preferred form of the assemblage of Fig. 1, container 54 is constructed from a blank of three-ply sheet material having a single fold. The outer ply serves as a backing or support and is composed of an inexpensive, tough material, preferably a paper such as kraft paper. The intermediate ply is composed of a substantially vapor- and liquid-impervious material, for example, a metal foil such as lead foil. The inner ply is composed of a thermoplastic or thermosetting plastic material, for example, a polyvinyl acetal such as polyvinyl butyral or polyvinyl formal, which protects processing composition 56 from contamination. At opposite end portions of the container, the two folds of the inner ply are sealed to each other as by the application of heat and pressure. Those sections of the two folds defining the mouth are bonded together by a strip of adhesive which is so constituted that the adhesive forces between it and the inner ply are less than the cohesive forces between end portions of the inner ply which are sealed together. A satisfactory strip may be composed, for example, of ethyl cellulose or a mixture of ethyl cellulose and paraffin. Since the bonding forces between those sections defining the mouth are less than the bonding forces between other sections of the container, the application of opposed compressional forces to the container causes discharge of the container's contents through its mouth.

In another form of the assemblage of Fig. 1, element 38 includes a photosensitive ferric salt which, when photoexposed, is capable of being reduced to a ferrous salt. Element 38 here may be composed of a suitable paper, the surface of which is adapted to absorb a solution of the photosensitive ferric salt, or may be coated with a suitable colloid material which is adapted to imbibe such a solution. Alternatively, element 38 may be omitted where strip 50 itself is capable of imbibing such a solution. Suitable photosensitive ferric salts, for example, are ferric chloride and ferric salts of organic acids such as ferric oxalate, ferric tartrate and ferric citrate. Processing composition 56 here preferably includes a coupler which differentiates between ferric and ferrous salts to form a visibly distinguishable reduction product with one or the other. Examples of such a coupler are potassium ferricyanide, potassium ferrocyanide, the tannins, β-naphthoquinone sulfonic acid, and salts of silver, platinum and palladium.

In a modification of this form of the assemblage of Fig. 1, the photosensitive composition contained in element 38 includes a coupler as well as a photosensitive ferric salt. In such a case, processing composition 56 includes as a developer merely an alkali or an acid capable of providing the chemical environment necessary for combination of the coupler and either the ferrous or ferric salt.

In a further form of the assemblage of Fig. 1, element 38 carries a photosensitive diazonium compound which decomposes when photoexposed and processing composition 56 includes as a developer a coupler capable of combining with an exposed or unexposed diazonium compound to form a dye. The processing composition further includes either an alkali or an acid capable of providing the chemical environment necessary for combination of the exposed or unexposed diazonium compound and the coupler. Element 38 here may be composed of a suitable paper the surface of which is adapted to absorb a solution of the photosensitive diazonium compound, or may be coated with a suitable colloid material adapted to imbibe such a solution. Alternatively, element 38 may be omitted where strip 50 itself is capable of imbibing such a solution. Suitable photosensitive diazonium compounds, for example, are prepared by treating aromatic amines with nitrous acid at low temperature. As suitable couplers which processing composition 56 may here contain, mention may be made of phenols, naphthols and amino compounds which are adapted to combine with an exposed or unexposed diazo compound to form a visibly distinguishable azo dye.

This form of the invention may be modified so that the photosensitive composition includes a coupler as well as a photosensitive diazonium compound. In such a case, processing composition 56 includes as a developer merely an alkali or an acid capable of providing the chemical environment necessary for the combination of the coupler and either the exposed or unexposed diazonium compound.

In still another form of the assemblage of Fig. 1, element 38 carries a material capable of becoming differentially insolubilized or tanned when photoexposed. The various regions of such a differentially insoluble coating are capable of forming a visible print by differentially absorbing a suitable coloring material. A differentially insolubilizable material includes, for example, a hydrophilic colloid such as gelatin, glue or gum arabic treated with a dichromate solution such as an aqueous solution of chrome alum, potassium dichromate or ammonium dichromate. Here, processing composition 56 includes a coloring material such as a water-soluble dye.

Preferably, though not necessarily, photographic composition 56 is relatively viscous so as to be easily controlled when spread. If desired, its viscosity can be increased, for example by thickening it with a polymeric material such as a water-soluble cellulose, an insoluble emulsifiable oil, a starch, or a gum.

Figure 2:
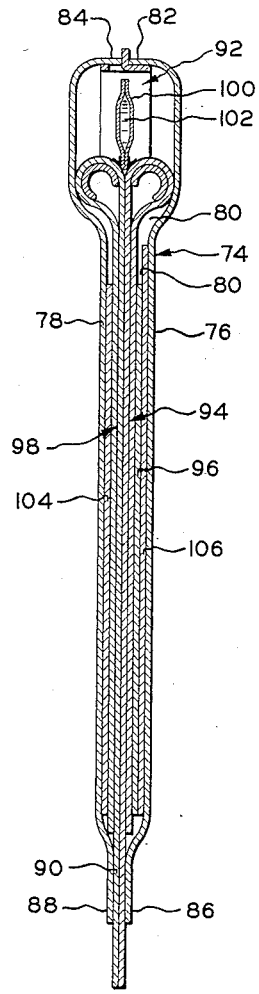
Fig. 2 is an exaggerated sectional view of another assemblage embodying the invention, the section being taken midway between its longitudinal edges.

Fig. 2 illustrates an assemblage, generally similar in structure and operation to that of Fig. 1, for use in X-radiography.

This assemblage comprises an envelope 74 having front and rear light opaque face portions 76 and 78 which define a chamber 80 and edge portions of which pairs of longitudinal edge portions (not shown) and a pair of transverse edge portions 82 and 84 connect the front and rear face portions and a pair of transverse edge portions 86 and 88 which define a lighttight passage 90 communicating with the chamber. Within chamber 80 are a pressure-applying unit 92, a flexible strip 94, a photosensitive element 96, a flexible strip 98, a container 100, processing composition 102 and another element 104, which are similar, respectively, to pressure-applying unit 42, flexible strip 50, photosensitive element 38, flexible strip 52, container 54, processing composition 56 and element 58 of the assemblage of Fig. 1.

Photosensitive element 96 may be exposed to penetrative radiation through either front face portion 76 or rear face portion 78. If desired, an intensifying screen 106 of conventional construction may be associated with photosensitive element 96, for example, it may be interposed between front face portion 76 and the photosensitive element.

Figure 3:
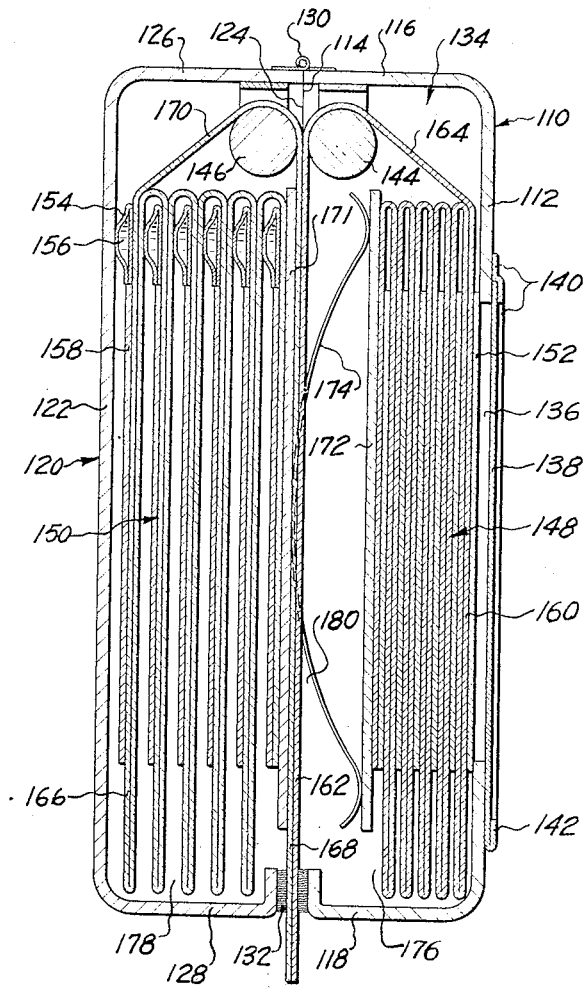
Fig. 3 is an exaggerated sectional view of a further assemblage embodying the invention, the section being taken midway between its longitudinal edges.

Fig. 3 illustrates a self-container photographic exposing and developing assemblage comprising a re-usable magazine, a strip carrying a plurality of photosensitive elements, and a strip carrying photographic materials for processing them.

The magazine, composed of a durable material such as plastic, metal or wood, comprises: a front housing 110 which includes a front face 112, front longitudinal edges one of which is shown at 114, and front transverse edges 116 and 118; and a rear housing 120 which includes a rear face 122, rear longitudinal edges one of which is shown at 124, and rear transverse edges 126 and 128. Front transverse edge 116 and rear transverse edge 126 are pivoted together at 130 so that front housing 110 and rear housing 120 are constrained with respect to each other between open position at which the interior of the magazine is accessible and closed position at which the front and rear transverse edges 118 and 128 define a lighttight passage 132 and the remaining front and rear longitudinal transverse edges, in lighttight engagement, define a chamber 134. Front and rear housings 110 and 120 may be locked in closed position by any suitable means. Passage 132 may be rendered lighttight by such conventional materials as felt or bristles.

Front face 112 is provided with a path 136 through which actinic light may be transmitted. Associated with path 136 is a dark slide 138 which is constrained for movement between open and closed position by a U-shaped rail 140 along three sides of path 136 and which is provided with a manually engageable, reversely bent lug 142.

Mounted within chamber 134 on transverse edges 116 and 126, respectively, are pressure-applying rollers 144 and 146 which are urged resiliently toward each other, for example, by springs (not shown) when front housing 110 and rear housing 120 are in closed position.

Within chamber 134 are a pair of flexible strips 148 and 150 each including a plurality of overlapping sections, alternate sections of the former carrying a succession of photosensitive elements 152 and alternate sections of the latter carrying a succession of containers 154 of processing composition 156 and a succession of other elements 158. Strips 148 and 150, elements 152 and 158 and processing composition 156 are similar in composition, respectively, to strips 50 and 52, elements 38 and 58, and processing composition 56 of Fig. 1. Strip 148 is so arranged that its outer section 160, which underlies front face 112, and its inner section 162, which extends through chamber 134 and passage 132, are joined by a loop 164 about roller 144. The remaining sections of strip 148 are disposed in zigzag fashion between outer section 160 and inner section 162 so that as successive sections of the strip are advanced from their positions underlying front face 112, the outermost photosensitive element 152 always faces path 136. Strip 150 is so arranged that its outer section 166, which underlies rear face 122, and its inner section 168, which extends through chamber 134 and passage 132, are joined by a loop 170 about roller 146. The remaining sections of strip 150 are disposed in zigzag fashion between outer section 166 and inner section 168 so that as successive sections of the strips are advanced from their position underlying rear face 122, containers 154 are ruptured and their contents spread between associated elements 152 and 158 which are superposed when advancing between rollers 144 and 146.

In order to prevent superposed sections of strips 148 and 150 from being disturbed by the succeeding sections of strip 150, a plate 171 is affixed to rear housing 120. In order to prevent superposed sections of strips 148 and 150 from being disturbed by the succeeding sections of strip 148, a plate 172 is mounted on front housing 110 for parallel movement with respect to front face 112. When front and rear housings 110 and 120 are in closed position, plate 172 is urged toward front face 112 by a pair of leaf springs 174, secured to plate 171 at its opposite transverse edges, in order that the outer most photosensitive element 152 be properly positioned for exposure against front face 112. Thus the region 176 between front face 112 and plate 172 is a storage region for sections of strip 148, the region 178 between rear face 122 and plate 171 is a storage region for sections of strip 150, and the region 180 between plates 171 and 172 is a processing region within which associated elements 152 and 158 may be superposed.

A variety of alternative configurations of strips 148 and 150 within their respective storage regions will be apparent to persons skilled in the art.

In operation, the magazine of Fig. 3 may be loaded by pivoting front and rear housings 110 and 120 into open position, disposing packs of strips 148 and 150 in storage regions 176 and 178, and extending their leading ends around rollers 144 and 146, and beyond those portions of transverse edges 118 and 128 which define passage 132 when front and rear housings 110 are in closed position. Once the magazine is closed, it may be removably attached in conventional fashion at the rear of a camera, and dark slide 138 may be opened to permit the exposure of outermost photosensitive element 152. Thereafter, strips 148 and 150 are advanced by an operator's grasping their leading ends between rollers 144 and 146 in order to rupture container 154 and to spread processing composition 156 between elements 152 and 158. The resulting sandwich, while being formed, advances into processing region 180 and, once formed, is permitted to remain there for a predetermined period during which photosensitive element 152 is processed. At the end of this period, the sandwich is advanced through passage 132 from the magazine by an operator once again grasping the strips' leading ends, and elements 152 and 158 may be stripped apart for observation. At this point, the photosensitive element 152 succeeding the photosensitive element just processed underlies path 136 in proper position for exposure.

Figure 4:
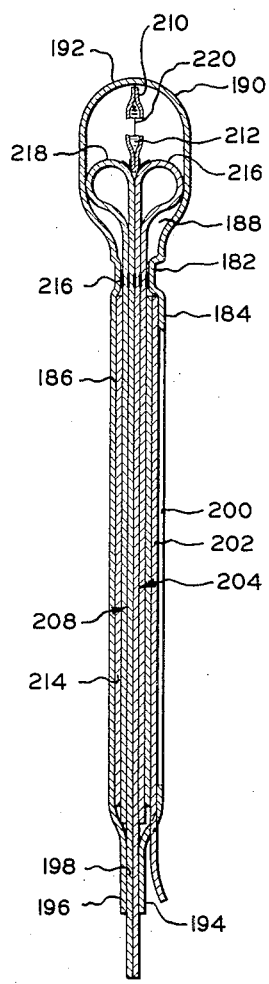
Fig. 4 is an exaggerated sectional view of still another embodiment of the invention, the section being taken midway between its longitudinal edges.

Fig. 4 illustrates a disposable assemblage which comprises an ordinarily lighttight envelope, a strip carrying a single photosensitive element and a strip carrying photographic materials for processing it. This assemblage, which does not comprise a pair of pressure-applying members, is designed to be processed by pressure-applying members, for example, machined metallic rollers, provided by a re-usable device.

This assemblage comprises an envelope 182 having front and rear face portions 184 and 186 which define a chamber 188 and edge portions of which pairs of longitudinal edge portions (not shown) and a pair of transverse edge portions 190 and 192 connect the front and rear face portions and a pair of transverse edge portions 194 and 196 define a lighttight passage 198 communicating with the chamber. Front face portion 184 provides a path 200 through which actinic radiation may be transmitted and a dark slide 202 associated with the path.

Within chamber 188 are a flexible strip 204, a photosensitive element 206, a flexible strip 208, a container 210, processing composition 212 and another element 214, which are similar, respectively, to flexible strip 50, photosensitive element 38, flexible strip 52, container 54, processing composition 56 and element 58 of the assemblage of Fig. 1.

Strips 204 and 208 provide a pair of loops 216 and 218 which are accessible through an opening 220 in envelope 182 to a pair of pressure-applying rollers (not shown) of a suitable pressure-applying device. This opening, for example, may be closed normally by flaps (not shown) which coact with the pressure-applying device to render the opening lighttight when the assemblage is in operation. Loops 216 and 218 are positioned in the upper region of chamber 188 separated from the lower region of chamber 188 by a plurality of rupturable seals 226 which shield the lower region from light entering the upper region when the rollers are inserted. Container 210 need not be mounted on strip 204 but may be inserted into the upper region of chamber 188 with the rollers when the flaps are opened.

The operation of the assemblage of Fig. 4, when mounted upon the pressure-applying device, is similar to the operation of the assemblage of Fig. 1. The assemblage of Fig. 4, after being used, may be detached from the pressure-applying device and disposed of.

Figure 5:
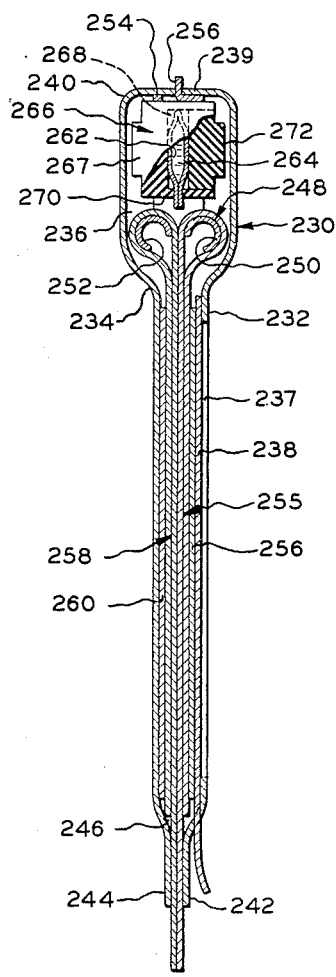
Fig. 5 is an exaggerated sectional view of a modification of the assemblage of Fig. 1.

Fig. 5 illustrates a modification of the assemblage of Fig. 1. This assemblage comprises an envelope 230 having front and rear face portions 232 and 234 which define a chamber 236. Face portion 232 provides a path 237 which ordinarily is covered by a dark slide 238. Pairs of longitudinal edge portions (not shown) and a pair of transverse edge portions 239 and 240 connect front and rear face portions 232 and 234. A pair of transverse edge portions 242 and 244 define a lighttight passage 246 communicating with chamber 236. Mounted within chamber 236 is a pressure-applying unit 248 in the form of a resilient sheet metal stamping from which are shaped a pair of elongated pressure-applying arcs 250 and 252 that are predeterminedly spaced apart, a crosspiece 254 and a lug 256 that extends through envelope 230 in order to enable an operator to hold the arcs as well as the assemblage as a whole firmly in one position. Also positioned within chamber 236 are a flexible strip 255, a photosensitive element 256, a flexible strip 258, another element 260 and a container 262 of processing composition 264 which are similar, respectively, to flexible strip 50, photosensitive element 38, flexible strip 52, element 58 and container 54 of processing composition 56. Here, container 262, rather than being carried by flexible strip 258, is carried within a manually operable squeeze unit 266 secured to crosspiece 254. This squeeze unit which, for example, is composed of a suitable plastic, includes a female platen 267 providing a cavity 268 which carries container 262. One wall of cavity 268 is provided with an opening 270 through which the mouth of container 262 projects. Cavity 268 slidably receives a male platen 272.

In operation, processing composition 264 is ejected from container 262 onto flexible strips 255 and 258 in response to pressure applied between platens 267 and 272 through front and rear face portions 232 and 234 by the fingers of an operator. Once so ejected, processing composition 264 is spread between elements 257 and 260 in the manner described above.

It is possible in an assemblage of this type to omit squeeze unit 266 and to secure container 262 directly to crosspiece 254 so that it may be ruptured by pressure from the fingers of an operator without the aid of a special squeeze device.

The term "photosensitive" and other terms of similar import are herein employed in the generic sense to describe materials possessing physical and chemical properties which enable them to form usable images when photoexposed by actinic radiation.

Since certain changes may be made in the above product without departing from the scope of the invention herein involved, it is intended that all matter contained in the above description or shown in the accompanying drawings shall be interpreted as illustrative and not in at limiting sense.

What is claimed is:

1. A photographic assemblage comprising a generally flat magazine defining a chamber, said magazine having a front face and a rear face one of which provides a path for actinic radiation and a pair of opposed extremities one of which provides a lighttight passage, and a pair of flexible strips within said chamber each of which has inner and outer overlapping sections joined by a loop at the other of said pair of opposed extremities, said front face, said overlapping sections and said rear face being substantially parallel, the outer section of one of said strips carrying a photosensitive element containing a member of the class consisting of silver, iron, diazonium and chromium compounds in a first region underlying said front face, the outer section of the other of said strips being located in a second region underlying said rear face and the inner sections of said strips extending in superposed relation through a third region interposed between said first region and said second region and through said passage.

2. The photographic assemblage of claim 1 wherein said outer section of said one of said strips is composed of a gelatino silver halide emulsion and the outer section of said other of said strips carries a silver-receptive stratum composed of a matrix material capable of receiving a print-forming agent released when said photosensitive element is subjected to a solution containing a silver halide developer.

3. The photographic assemblage of claim 1 wherein said photosensitive element contains a silver halide emulsion and said outer section of said other of said strips carries an image-receptive element containing silver precipitating nuclei.

4. The photographic assemblage of claim 1 wherein said photosensitive element contains a silver halide emulsion, said outer section of said other of said strips carries an image-receptive element containing silver precipitating nuclei and associated with said strips is a container carrying an aqueous alkaline solution of a silver halide developer and a silver halide solvent.

5. A photographic assemblage comprising a generally flat magazine defining a chamber, said magazine having a front face and a rear face one of which provides a path for actinic light, said front face and said rear face being generally parallel, said magazine having a pair of opposed extremities one of which provides a lighttight passage and a dark slide for permitting transmission of said light through said path when in open position and for rendering said chamber lighttight when in closed position, and a pair of flexible strips within said chamber each of which has inner and outer overlapping sections joined by a loop at the other of said pair of opposed extremities, the outer section of one of said strips carrying a photosensitive element and underlying said front face, the outer section of the other of said strips underlying said rear face, the inner sections of said strips extending in superposed relation through said chamber and said passage.

6. A photographic assemblage comprising a generally flat magazine defining a lighttight chamber, said magazine having a front face and a rear face one of which provides a path for penetrative radiation, said front face and said rear face being generally parallel, said magazine having a pair of opposed extremities one of which provides a lighttight passage and an intensifying screen underlying said front face, and a pair of flexible strips within said chamber each of which has inner and outer overlapping sections joined by a loop at the other of said pair of opposed extremities, the outer section of one of said strips carrying a photosensitive element and underlying said intensifying screen, the outer section of the other of said strips underlying said rear face, the inner sections of said strips extending in superposed relation through said chamber and said passage.

7. A photographic assemblage comprising a generally flat magazine defining a chamber, said magazine having a front face and a rear face one of which provides a path for actinic radiation and a pair of opposed extremities one of which provides a lighttight passage, a pair of pressure-applying members mounted in said chamber at the other of said pair of opposed extremities, and a pair of flexible strips within said chamber one each of which has inner and outer overlapping sections joined by a loop about one each of said pressure-applying members, the outer section of one of said strips carrying a photosensitive element in a first region underlying said front face, the outer section of the other of said strips being located in a second region underlying said rear face, the inner sections of said strips extending in superposed relation through a third region interposed between said first region and said second region and through said passage.

8. The photographic assemblage of claim 7 wherein said overlapping sections of said flexible strips are generally parallel to said faces.

9. The photographic assemblage of claim 8 wherein said outer section of said other of said strips carries an image-receptive element.

10. The photographic assemblage of claim 8 wherein said photosensitive element contains a silver halide emulsion and said outer section of said other of said strips carries an image-receptive element containing silver precipitating nuclei.

11. The photographic assemblage of claim 10 wherein a container carrying a processing composition is associated with said strips within said chamber, said processing composition containing a viscous alkaline aqueous solution of a silver halide developer and a silver halide solvent.

12. A photographic assemblage comprising a generally flat magazine defining a chamber, said magazine having a front face and a rear face one of which provides a path for actinic light, a pair of opposed extremities one of which provides a lighttight passage, a pair of pressure-applying members mounted within said chamber at the other of said pair of opposed extremities and a dark slide for permitting transmission of said light through said path when in open position and for rendering said chamber lighttight when in closed position, and a pair of flexible strips within said chamber one each of which has inner and outer overlapping extended sections joined by a loop about one each of said pressure-applying members, the outer section of one of said strips carrying a photosensitive element in a first region underlying said front face, the outer section of the other of said strips being located in a second region underlying said rear face, the inner sections of said strips extending in superposed relation through a third region located substantially entirely between said first region and said second region and through said passage.

13. A photographic assemblage comprising a generally flat magazine defining a lighttight chamber, said magazine having a front face and a rear face one of which provides a path for penetrative radiation, a pair of opposed extremities one of which provides a lighttight passage, a pair of pressure-applying members in said chamber at the other of said pair of opposed extremities and an intensifying screen underlying said front face, and a pair of flexible strips within said chamber one each of which has inner and outer overlapping extended sections joined by a loop about one each of said pair of pressure-applying members, the outer section of one of said strips carrying a photosensitive element in a first region underlying said intensifying screen, the outer section of the other of said strips being located in a second region underlying said rear face, the inner sections of said strips projecting in superposed relation through a third region located substantially entirely between said first region and said second region and through said passage.

14. A photographic assemblage comprising a generally flat magazine defining a chamber, said magazine having a front face and a rear face one of which provides a path for actinic radiation and a pair of opposed extremities one of which provides a lighttight passage, said front face and said rear face being generally parallel, a first flexible strip having an inner section, an outer section and a plurality of additional sections arranged in zigzag fashion therebetween, and a second strip having an inner section, an outer section and a plurality of additional sections arranged in zigzag fashion therebetween, said outer section of said first strip being joined to said inner section of said first strip by a loop at the other of said pair of opposed extremities and being joined to said additional sections of said first strip at said one of said pair of opposed extremities, said outer section of said second strip being joined to said inner section of said second strip by a loop at said other of said opposed extremities and being joined to said additional sections of said second strip at said one of said pair of opposed extremities, alternate sections of said first strip carrying a succession of photosensitive elements, said outer section and said additional sections of said first strip underlying said front face, said outer section and said additional sections of said second strip underlying said rear face, said inner section of said first strip and said inner section of said second strip extending in superposed relation through said chamber and said passage.

15. A photographic assemblage comprising a generally flat magazine defining a chamber, said magazine having a front face and a rear face one of which provides a path for actinic radiation and a pair of opposed extremities one of which provides a lighttight passage, a first flexible strip having an inner section, an outer section and a plurality of additional sections arranged in zigzag fashion therebetween, a second strip having an inner section, an outer section and a plurality of additional sections arranged in zigzag fashion therebetween, and a pair of pressure-applying rollers mounted within said chamber at the other of said pair of opposed extremities, said outer section of said first strip being joined to said inner section of said first strip by a loop about one of said pressure-applying members and being joined to said additional sections of said first strip at said one of said pair of opposed extremities, said outer section of said second strip being joined to said inner section of said second strip by a loop about the other of said pressure-applying members and being joined to said additional sections of said second strip at said one of a pair of opposed extremities, alternate sections of said first strip carrying a succession of photosensitive elements, said outer section and said additional sections of said first strip being located in a first region underlying said front face, said outer section and said additional sections of said second strip being located in a second region underlying said rear face and said inner section of said first strip and said inner section of said second strip extending in superposed relation through a third region located substantially entirely between said first region and said second region and through said passage.

16. The photographic assemblage of claim 15 wherein a platen is mounted within said chamber on said magazine for resiliently pressing said outer section and said additional sections of said first strip toward said front face.

17. A photographic assemblage comprising a generally flat magazine defining a chamber, said magazine having a front face and a rear face one of which provides a path for actinic radiation and a pair of opposed extremities one of which provides a lighttight passage, and a pair of flexible strips within said chamber each of which has inner and outer overlapping sections joined by a loop in a region of said chamber adjacent to the other of said pair of opposed extremities, said magazine providing an opening at said other of said pair of opposed extremities, said region being accessible to a pair of pressure-applying members through said opening in said magazine, the outer section of one of said strips carrying a photosensitive element and underlying said front face, the outer section of the other of said strips underlying said rear face, the inner sections of said strips extending in superposed relation through said chamber and said passage.

18. The photographic assemblage of claim 17 wherein said region is separated from the remaining regions of said chamber by seals serving to shield said remaining regions from light entering said opening.

19. A photographic device comprising a generally flat housing having a pair of generally flat, opposed faces, said housing defining a generally flat first region underlying a first face of said housing, a generally flat second region underlying a second face of said housing and a generally flat intermediate region between said first region and said second region, a pair of pressure-applying members mounted within said housing at one of a pair of opposed extremities thereof, the other of said pair of opposed extremities providing a lighttight passage, said first region and said intermediate region communicating for the reception of a flexible strip which has inner and outer overlapping sections joined by a loop about one of said pressure-applying members, said second region and said intermediate region communicating for the reception of a second strip which has inner and outer overlapping sections joined by a loop about the other of said pressure-applying members, the outer section of said first strip carrying a photosensitive element which underlies said first face, the outer section of said second strip underlying said second face, and the inner sections of said first strip and said second strip extending in superposed relation through said intermediate region and said lighttight passage, one of said faces providing a path for actinic radiation to said photosensitive element.

20. A photographic assemblage comprising a generally flat magazine defining a chamber, said magazine having a front face and a rear face one of which provides a path for actinic radiation and a pair of opposed extremities one of which provides a lighttight passage, a pair of flexible strips within said chamber each of which has inner and outer overlapping sections joined by a loop at the other of said pair of opposed extremities, said loops being adjacent to each other and providing a bite, the outer section of one of said strips carrying a photosensitive element in a first region underlying said front face, said photosensitive element containing a silver halide emulsion, the outer section of the other of said strips being located in a second region underlying said rear face, said outer section of said other of said strips carrying an image-receptive element containing silver precipitating nuclei, the inner sections of said strips extending in superposed relation through a third region interposed between said first region and said second region and through said passage, and a rupturable container of a processing composition adjacent to said bite.

21. The photographic assemblage of claim 20 wherein said rupturable container is secured to at least one of said loops at said bite for the purpose of spreading said composition between said outer sections of said strips when advanced into said third region.

22. A photographic assemblage comprising a generally flat magazine defining a chamber, said magazine having a front face and a rear face one of which provides a path for actinic light, said front face and said rear face being generally parallel, said magazine having a pair of opposed extremities one of which provides a lighttight passage and a dark slide for transmission of said light through said path when in open position and for rendering said chamber lighttight when in closed position, and a pair of flexible strips within said chamber each of which has inner and outer overlapping sections joined by a loop at the other of said pair of opposed extremities, the loops being adjacent to each other and providing a bite, the outer section of one of said strips carrying a photosensitive element and underlying said front face, the outer section of the other of said strips underlying said rear face, the inner sections of said strips extending in superposed relation through said chamber and said passage, and a rupturable container of a processing composition adjacent to said bite.

23. The photographic assemblage of claim 22 wherein said rupturable container is secured to at least one of said loops at said bite for the purpose of spreading said composition between said outer sections of said strips when advanced into said third region.

24. A photographic assemblage comprising a generally flat magazine defining a lighttight chamber, said magazine having a front face and a rear face one of which provides a path for penetrative radiation, said front face and said rear face being generally parallel, said magazine having a pair of opposed extremities one of which provides a lighttight passage and an intensifying screen underlying said front face, and a pair of flexible strips within said chamber each of which has inner and outer overlapping sections joined by a loop at the other of said pair of opposed extremities, the loops being adjacent to each other and providing a bite, the outer section of one of said strips carrying a photosensitive element and underlying said intensifying screen, the outer section of the other of said strips underlying said rear face, the inner sections of said strips extending in superposed relation through said chamber and said passage, and a rupturable container of a processing composition positioned adjacent to said bite.

25. The photographic assemblage of claim 24 wherein said rupturable container is secured to at least one of said loops at said bite for the purpose of spreading said composition between said outer sections of said strips when advanced into said third region.

26. A photographic assemblage comprising a generally flat magazine defining a chamber, said magazine having a front face and a rear face one of which provides a path for actinic radiation and a pair of opposed extremities one of which provides a lighttight passage, a pair of pressure-applying members mounted in said chamber at the other of said pair of opposed extremities, and a pair of flexible strips within said chamber one each of which has inner and outer overlapping sections joined by a loop about one each of said pressure-applying members, the loops being adjacent to each other and providing a bite, the outer section of one of said strips carrying a photosensitive element in a first region underlying said front face, the outer section of the other of said strips being located in a second region underlying said rear face, the inner sections of said strips extending in superposed relation through a third region interposed between said first region and said second region and through said passage, and a rupturable container of a processing composition adjacent to said bite.

27. The photographic assemblage of claim 26 wherein said rupturable container is secured to at least one of said loops at said bite for the purpose of spreading said composition between said outer sections of said strips when advanced into said third region.

28. A photographic assemblage comprising a generally flat magazine defining a chamber, said magazine having a front face and a rear face one of which provides a path for actinic light, a pair of opposed extremities one of which provides a lighttight passage, a pair of pressure-applying members mounted within said chamber at the other of said pair of opposed extremities and a dark slide for permitting transmission of said light through said path when in open position and for rendering said chamber lighttight when in closed position, and a pair of flexible strips within said chamber one each of which has inner and outer overlapping extended sections joined by a loop about one each of said pressure-applying members, the loops being adjacent to each other and providing a bite, the outer section of one of said strips carrying a photosensitive element in a first region underlying said front face, the outer section of the other of said strips being located in a second region underlying said rear face, the inner sections of said strips extending in superposed relation through a third region located substantially entirely between said first region and said second region and through said passage, and a rupturable container of a processing composition adjacent to said bite.

29. The photographic assemblage of claim 28 wherein said rupturable container is secured to at least one of said loops at said bite for the purpose of spreading said composition between said outer sections of said strips when advanced into said third region.

30. A photographic assemblage comprising a generally flat magazine defining a lighttight chamber, said magazine having a front face and a rear face one of which provides a path for penetrative radiation, a pair of opposed extremities one of which provides a lighttight passage, a pair of pressure-applying members in said chamber at the other of said pair of opposed extremities and an intensifying screen underlying said front face, and a pair of flexible strips within said chamber one each of which has inner and outer overlapping extended sections joined by a loop about one each of said pair of pressure-applying members, the loops being adjacent to each other and providing a bite, the outer section of one of said strips carrying a photosensitive element in a first region underlying said intensifying screen, the outer section of the other of said strips being located in a second region underlying said rear face, the inner sections of said strips projecting in superposed relation through a third region located substantially entirely between said first region and said second region and through said passage, and a rupturable container of a processing composition adjacent to said bite.

31. The photographic assemblage of claim 30 wherein said rupturable container is secured to at least one of said loops at said bite for the purpose of spreading said composition between said outer sections of said strips when advanced into said third region.

32. A photographic assemblage comprising a generally flat magazine defining a chamber, said magazine having a front face and a rear face one of which provides a path for actinic radiation and a pair of opposed extremities one of which provides a lighttight passage, and a pair of flexible strips within said chamber each of which has inner and outer overlapping sections joined by a loop in a region of said chamber adjacent to the other of said pair of opposed extremities, the loops being adjacent to each other and providing a bite, said magazine providing an opening at said other of said pair of opposed extremities, said region being accessible to a pair of pressure-applying members through said opening in said magazine, the outer section of one of said strips carrying a photosensitive element and underlying said front face, the outer section of the other of said strips underlying said rear face, the inner sections of said strips extending in superposed relation through said chamber and said passage, and a rupturable container of a processing composition adjacent to said bite.

33. The photographic assemblage of claim 32 wherein said rupturable container is secured to at least one of said loops at said bite for the purpose of spreading said composition between said outer sections of said strips when advanced into said third region.

References Cited in the file of this patent
UNITED STATES PATENTS

| | | |
|---|---|---|
| 2,435,720 | Land | Feb. 10, 1948 |
| 2,472,358 | Wolff | June 7, 1949 |
| 2,495,111 | Land | Jan. 17, 1950 |
| 2,510,306 | Bachelder | June 6, 1950 |